United States Patent [19]

Kasner et al.

[11] Patent Number: 4,827,098
[45] Date of Patent: May 2, 1989

[54] FLEXIBLE LASER WELDING HEAD FOR SLEEVE-TO-TUBE WELDING

[75] Inventors: William H. Kasner, Penn Hills; Vincent A. Toth, Penn Township, Westmoreland County; Phillip J. Hawkins, Penn Hills Township, Allegheny Township, all of Pa.

[73] Assignee: Westinghouse Electric Corp., Pittsburgh, Pa.

[21] Appl. No.: 69,722

[22] Filed: Jul. 6, 1987

[51] Int. Cl.⁴ .............................................. B23K 26/00
[52] U.S. Cl. ........................... 219/121.63; 219/121.74; 219/121.75; 219/121.83; 350/573
[58] Field of Search ................. 219/121 LC, 121 LD, 219/121 LR, 121 LQ, 121 LZ; 350/573

[56] References Cited

U.S. PATENT DOCUMENTS

| | | | |
|---|---|---|---|
| 3,382,343 | 5/1968 | Muncheryan | 219/121 LC |
| 3,383,491 | 0/1968 | Muncheryan | 219/121 LC |
| 3,466,111 | 9/1969 | Ring | 350/573 |
| 3,821,510 | 0/1974 | Muncheryan | 128/303.1 |
| 4,326,118 | 4/1982 | Smith | 219/121 LD |
| 4,579,862 | 7/1985 | Lamatsch et al. | 219/121 LD |

FOREIGN PATENT DOCUMENTS 0159287 9/1984 Japan .......................... 219/121 LD

OTHER PUBLICATIONS

J. Reason, "Borescope or fiberscope: What's best for your inspection task?", *Power*, p. 63–64, (Feb. 1985).

Primary Examiner—C. L. Albritton

[57] ABSTRACT

In one embodiment, a laser welding head is formed of a hollow tubular housing, and includes multiple focusing means for refocusing and realigning the laser beam if it is misaligned relative to the axis of the housing. In another embodiment, the housing is formed of a plurality of flexibly interconnected segments having at least one focusing means in each segment for realigning the beam and for directing the laser beam along interconnected linear paths.

17 Claims, 10 Drawing Sheets

FLEXIBLE LASER WELDING HEAD FOR SLEEVE-TO-TUBE WELDING

BACKGROUND OF THE INVENTION

1. Field of the Invention

This invention relates to welding apparatus and more particularly to welding apparatus adapted for welding a sleeve within a curved or deformed tube using a laser beam.

2. Description of the Prior Art

In tube-type heat exchangers, a first working fluid flows internally through a bundle of tubes, a second working fluid flows externally of the tubes and heat exchange occurs between the two fluids through the tube walls. Occasionally a tube may become defective due to corrosion or other known failure mechanisms so that a leak occurs which allows the two working fluids to mingle. When a leak occurs, not only is heat exchange efficiency diminished, co-mingling of working fluids can cause damage to the heat exchangers as well as equipment connected to it. Accordingly, when a leak occurs it must be either plugged or repaired. Sometimes the tube is taken out of service by plugging both ends on either side of the leak. While such procedure is effective to stop the leak, it causes a reduction in heat exchange capacity because the tube has been removed from service. Sometimes it is possible to repair the tube but often repairs are difficult to effect.

In a nuclear reactor, tube-type heat exchangers are commonly used as steam generators. Generally the working fluid flowing through the tubes of a nuclear steam generator is radioactive. When a defect occurs in a tube of a nuclear steam generator resulting in a co-mingling of the working fluids, not only does the leak reduce the effective heat exchange capability of the device and endanger equipment coupled thereto, it also creates a radioactive contamination hazard. Therefore, whatever steps are taken to stop the leak must be effective. If a repair can be made, this is preferred because heat exchange capacity is not significantly affected.

There are several methods known in the art for repairing tubes. Many of these methods are not applicable to repair heat exchange tubes because the defective portion of the tube may not be readily accessible. The problem of accessibility is compounded in nuclear steam generators because of the radioactive nature of the environment in which such structures are used.

One method used in the repair of heat exchange tubes in a nuclear steam generator involves the use of a metal sleeve having an outside diameter slightly smaller than the inside diameter of the defective tube. The sleeve is inserted into the defective tube and attached to it in such a way as to bridge the defective area of the tube. The ends of the sleeve are welded to the interior surfaces of the tube to thereby effect the repair.

In U.S. patent application Ser. No. 821,675 entitled "Laser Welding of a Sleeve Within a Tube" filed in the name of William H. Kasner of Jan. 23, 1986, a method of welding a sleeve within a tube of a nuclear steam generator is described. The method involves locating the sleeve within the tube at the weld site, positioning a high power laser remote from the weld site, inserting a welding head apparatus at the end of a laser beam transmitting means into the tube near the weld site and communicating laser energy along the transmitting means to the weld site for application to the internal surfaces of the sleeve for welding the sleeve to the tube.

Related U.S. patent application Ser. No. 821,674 entitled "Laser Welding Head for Sleeve to Tube Welding" filed in the name of Hawkins et al. on Jan. 23, 1986, describes the specific arrangement of the laser welding head which includes a straight cylindrical housing which is adapted to extend axially into a steam generator tube and rotate therein for providing a circumferential weld between the sleeve and the tube.

U.S. patent application Ser. No. 821,673 entitled "Laser Beam Alignment and Transport System" filed Jan. 23, 1986 in the name of Hawkins et al. discloses a method and apparatus for aligning the high power laser beam with the desired welding site at the output of the welding head.

According to the aforementioned United States Patent Applications, laser welding has proved to be an effective alternative to other welding methods because it is fast, accurate and produces a smaller heat affected zone. The various methods and apparatus described in the aforementioned patent applications require that the incident laser beam be aligned with respect to the optical axis of the welding head. If misalignment occurs, the laser beam is misdirected resulting perhaps in an inferior weld and possibly damage to the welding head due to absorption of some of the misdirected laser energy.

Proper laser welding may also be affected if the tube and sleeve have an axis different from the axis of the welding head. For example, the welding head described in the aforementioned patent applications is adapted for use in a straight section of a tube. If the tube has a bent or curved portion, the welding head may not be effective to communicate laser energy to the weld site because of misalignment of the tube and sleeve axes with the axis of the welding head.

FIG. 1 schematically illustrates in a simplified form a welding head 10 similar to the apparatus disclosed in the aforementioned patent applications suitable for welding a sleeve S within a tube T secured within a tube sheet TS of a nuclear steam generator. The welding head has an optical axis A and is adapted to direct the laser beam B (shown in parallel dotted lines) through the cylindrical body 12 which has an inlet 14 and an outlet 16. The welding head 10 projects through tube sheet TS into the tube T and concentric sleeve S that are to be welded together. A lens 18 and mirror 20 serve to focus the laser beam B and direct it through the outlet 16 in the cylindrical body 12 and onto the inner surface of the sleeve S at the weld site W where welding occurs. Means (not shown) is provided to rotate the cylindrical body 12 of the welding head 10 about the optical axis A (shown by the centerline) thereby causing a circumferential weld to be made between the inner surface of the tube T and the outer surface of the sleeve S whereby the sleeve is firmly attached to the tube.

There are conditions under which the quality of laser welding performed by the laser welding head 10 described above may be adversely affected. One condition occurs if the axis $a_b$ of the incident laser beam B is significantly misaligned relative to the optical axis A of the welding head 10 as shown in FIG. 2. In such case the laser beam B is projected towards the cylindrical body 12 at an angle q such that the beam strikes the inside wall 22 of the cylindrical body 12 resulting in scattering and absorption losses. Thus, the laser energy is only partially collected and focused by the lens 18 and mirror 20 resulting in the loss of power delivered to the weld site W, and possibly an inferior weld. Also, it is possible to damage the lens 18, mirror 20 and associated mounting structures (not shown) due to scattering and absorption. It is also possible to damage the inside walls 22 of the welding head 10 due to misdirected laser energy.

Another condition that can affect proper laser welding occurs if the tube T and sleeve S to be welded are significantly bend or deformed as shown in FIG. 3 in somewhat exaggerated form for purposes of illustration. In such case, the optical axis A of the welding head 10 is different from the central axis C of the tube T and sleeve S configuration. Thus it may not be possible to insert the welding head 10 sufficiently into the sleeve S to reach the weld site W. Even if it is possible for the weld head outlet 16 to be aligned with the weld site W, the welding head 10 may be too close to the weld site to effect a proper weld. Less severe deformation may permit the welding head 10 to be inserted but may restrict the free rotation of the welding head thereby resulting in damage to the apparatus and possibly an inferior weld.

The present invention as hereinafter described provides means to overcome both of the aforementioned problems. In addition, the improved welding head of the present invention permits the inclusion of a TV viewing system into the welding head assembly thereby providing for in situ inspection of the welds.

SUMMARY OF THE INVENTION

The invention is a laser welding head for welding a sleeve within a tube by heating the sleeve and tube to cause fusing of the interface therebetween, using a laser beam. The tube may be bent or deformed. The laser welding head comprises cylindrical housing having a laser beam inlet and outlet and an optical axis. In one embodiment, the cylindrical housing is formed of at least two interconnected hollow cylindrical segments which are adapted to be inserted axially into the tube and sleeve with the laser beam outlet directed at the sleeve to be welded. Flexible joint means interconnects the segments. Focusing means mounted in each respective segment focuses the beam at focal points near each flexible joint and directs the laser beam along the optical axis of the cylindrical housing. A proximal end of the cylindrical housing that is near the laser beam inlet is adapted to allow the cylindrical housing means to rotate axially within the sleeve.

In a simplified embodiment the cylindrical housing is formed of a single rigid segment. Plural focusing means within the cylindrical housing directs the laser beam along the optical axis of the housing to correct for possible initial laser beam misalignment.

The focusing means within each of the segments directs the laser beam to the next adjacent segment through a convergent zone or beam waist near the focal point. A detector having an aperture therein is located near the beam waist and is radially spaced therefrom. The detector is responsive to laser energy impinging thereon which results from the drift of the laser beam away from the optical axis of the cylindrical housing to produce a signal when the beam drifts.

Means aligned with the optical axis of the cylindrical housing is provided for permitting observation of the welding operation and inspection of the weld.

DETAILED DESCRIPTION OF THE PREFERRED EMBODIMENTS

Figure 4:
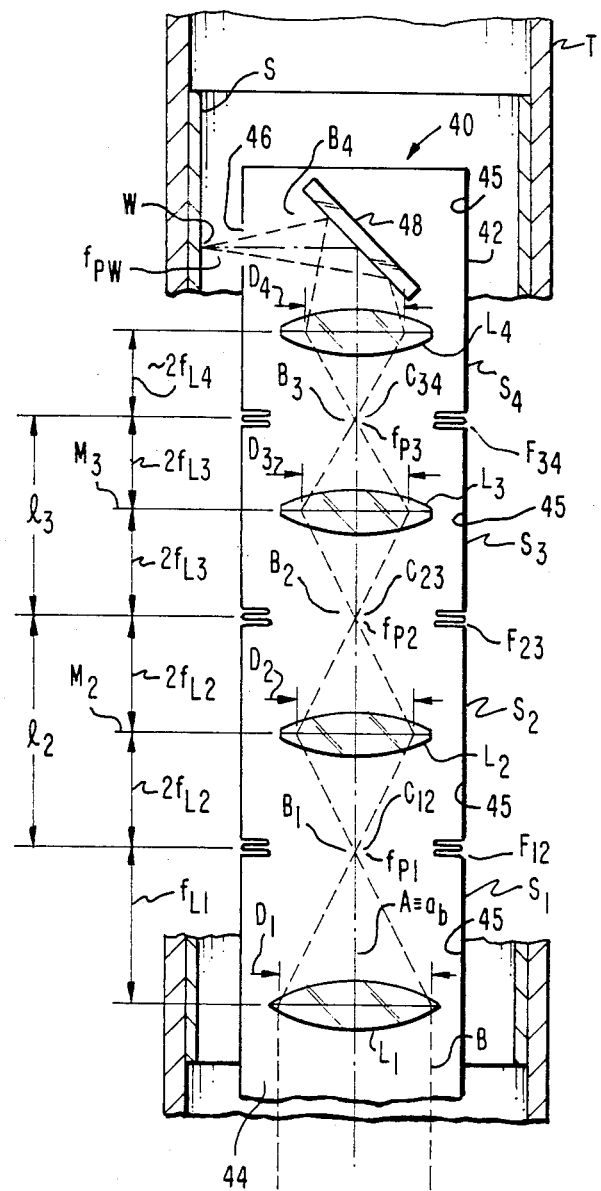
FIG. 4 is a schematic illustration in side section of a flexible welding head in accordance with one embodiment of the invention, that is formed of multiple segments and multiple lens elements for directing a laser beam along an optical axis of the welding head.

A flexible laser welding head (welding head) 40 that is constructed in accordance with one embodiment of the present invention is illustrated in FIG. 4. The welding head 40 includes a segmented cylindrical housing 42 formed of a number of hollow segments $S_1$–$S_4$ having a bore 45. The housing 42 has a beam inlet 44, a beam outlet 46 and an optical axis A. The several segments $S_1$–$S_4$ are connected together by flexible joints $F_{12}$, $F_{23}$ and $F_{34}$ having respective centers of rotation $C_{12}$, $C_{23}$ and $C_{34}$ located along the optical axis A at transitions between respective pairs of segments $S_1$–$S_2$, $S_2$–$S_3$ and $S_3$–$S_4$ as shown.

The flexible joints $F_{12}$–$F_{34}$ can be formed in several ways that are known in the art. One example of such flexible joints include convoluted bellows (as shown). The flexible joints $F_{12}$–$F_{34}$ permit the segments $S_1$–$S_4$ of the welding head 40 to rotate or become skewed relative to each other along the axis A in order to conform to or follow the configuration of a straight or bent tube, yet such flexible joints $F_{12}$–$F_{34}$ are stiff enough to support the segments despite their inclination to the axis A that is required to make a complete circumferential weld between the tube T and the sleeve S. Each segment $S_1$-$S_4$ has a corresponding lens element $L_1$, $L_2$, $L_3$ and $L_4$. The effective length of a segment is measured between centers of rotation at the opposite ends of the segments respectively. For example, the length $l_2$ of the segment $S_2$ is the distance between the centers $C_{12}$ and $C_{23}$. The effective length of a segment includes the length of the segment plus one-half of the length of each of its two interconnecting joint means, i.e., one joint means at each end of each segment except an end segment having only one joint means.

In the operation of the laser welding head 40 (FIG. 4), a laser beam B of diameter $D_1$ collimated along an axis $a_b$ is directed at the lens $L_1$ near the inlet 44. The beam B is brought to a first focus $f_{p1}$ along the optical axis A of the welding head 40 near the position of the first flexible joint $F_{12}$. In FIG. 4, the laser beam B has an optical axis $a_b$ which is colinear with the optical axis A of the welding head 40. Thus, the focal point $f_{p1}$ lies on the optical axis A of the welding head 40 and coincides with the center of rotation $C_{12}$ between the segments $S_1$ and $S_2$. The beam B propagates from focus $f_{p1}$ to lens $L_2$ where the beam has a diameter $D_2$. The lens $L_2$ refocuses the beam to a second focal point or focus $f_{p2}$ near the center of rotation $C_{23}$ of second flexible joint $F_{23}$ as shown. Similarly, the beam propagates to lens $L_3$ and there has a diameter $D_3$. The lens $L_3$ focuses the beam B at focal point $f_{p3}$ near the center of rotation $C_{34}$ of joint $F_{34}$. Thereafter the beam B of diameter $D_4$ passes through the lens $L_4$, it is reflected off of a mirror 48 and brought to a focus $f_{pw}$ at the contemplated weld site W where welding is to occur. In the embodiment shown in FIG. 4, each lens $L_1$-$L_4$ is located an integral number of its own respective focal lengths from each adjacent center of rotation. For example, lens $L_1$ (the first lens) is located in segment $S_1$ one focal length $f_{L1}$ from center of rotation $C_{12}$. If the optical axis A of the cylindrical housing 42 corresponds to the optical axis $a_b$ of the beam B, the focus $f_{p1}$ lies on the optical axis.

The lens $L_4$ (the last of nth lens) has a focal length $f_{L4}$ and is adjustably mounted in segment $S_4$ by means not shown but known in the art. The lens $L_4$ is located about two of its focal lengths $2f_{L4}$ from the center of rotation $C_{34}$. The lens $L_4$ is adjustable in order to provide for fine focusing (at $f_{pw}$) of the beam B on the weld site W.

The lenses $L_2$-$L_3$ (the intermediate lenses) have respective focal lengths $f_{L2}$ and $f_{L3}$ and are located at the respective midpoints $M_2$ and $M_3$ of the segments $S_2$ and $S_3$. the lens $L_2$ is located two of its focal lengths $2f_{L2}$ from each of the respective centers of rotation $C_{12}$ and $C_{23}$ of segment $S_2$. The effective length $l_2$ of segment $S_2$ is $4f_{L2}$ or the distance between $C_{12}$ and $C_{23}$ along axis A. The lens $L_3$ is similarly configured in segment $S_3$.

In the arrangement illustrated in FIG. 4, it is assumed that the cylindrical housing 42 is straight so that the optical axis A is colinear with the individual axes of each segment $S_1$-$S_4$. Also, it is assumed that the optical axis $a_b$ of the laser beam B is aligned with the optical axis A. If, as hereinafter described, the axis $a_b$ of the laser beam B is misaligned with the axis A of the housing 12 the multiple lens system of the present invention corrects such misalignment. If the tube T is bent, the flexibility of housing 42 in combination with the multiple lens system allows for laser beam transport along a series of interconnected straight lines.

Figure 5:
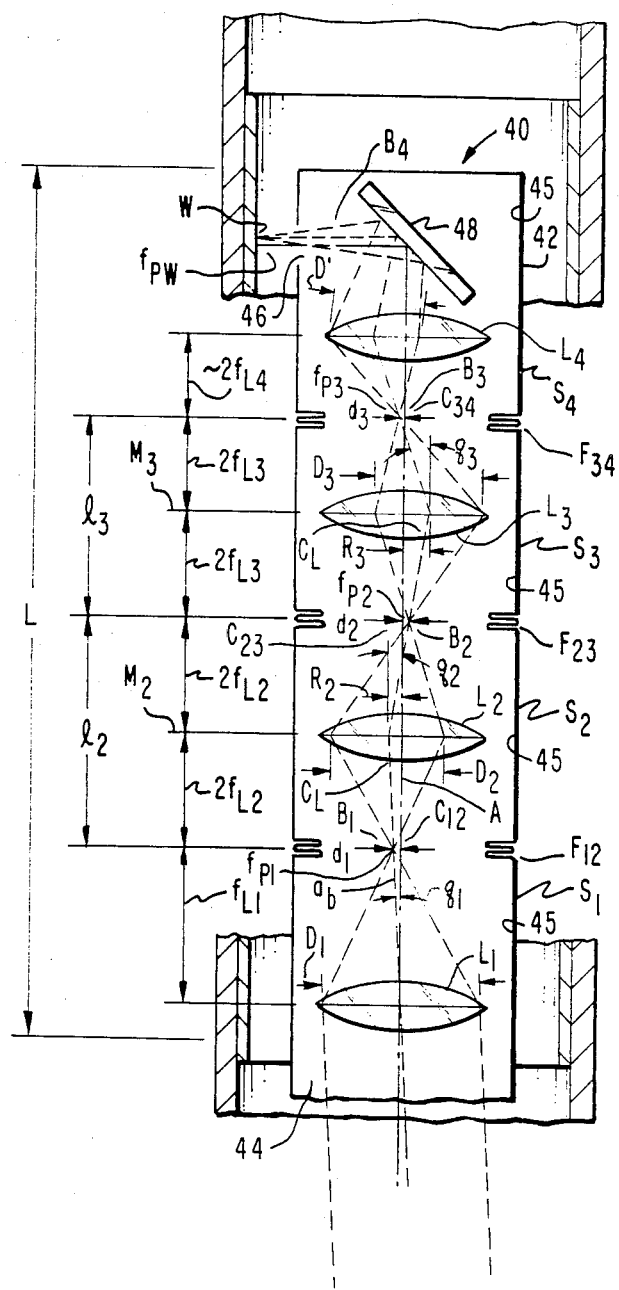
FIG. 5 is an illustration similar to FIG. 4 but showing the laser beam misaligned with respect to the optical axis of the welding head and illustrating the resulting path of the laser beam through the welding head.

FIG. 5 shows how a misaligned laser beam B will propagate through the laser welding head 40. In this case, tube T is straight and cylindrical housing 42, although flexible, is also straight. The laser beam B, represented by the dashed lines, has its optical axis $a_b$ incident on lens $L_1$ at an angle $q_1$ with respect to the optical axis A of the welding head 40. The laser beam is initially cylindrical and has a diameter $D_1$. The lens $L_1$ focuses the beam B so that it converges conically like an hour glass in a configuration known as a beam waist $B_1$. The focus of the lens $L_1$ occurs at $f_{p1}$ at a distance $d_1$ off the optical axis A of the welding head 40. The distance $d_1$ is given by the relation: $d_1 = f_{L1} \tan q_1$, for small $q_1$, $\tan q_1 = q_1$, hence $$d_1 = q_1 f_{L1}. \tag{1}$$

After passing through the focus $f_{p1}$, the laser beam B expands from the beam waist $B_1$ to a diameter $D_2$ at the lens $L_2$, where $$D_2 = D_1 \times 2f_{L2}/f_{L1}. \tag{2}$$

At the lens $L_2$ the center $C_L$ of the laser beam B is offset from the optical axis A of the welding head by an amount $$R_2 = d_1 + q_1 \times 2f_{L2}. \tag{3}$$

(The total offset $R_2$ between the lenses $L_1$ and $L_2$ equals the angle $q_1$ times the sum of the focal distances $f_{L1}$ and $2f_{L2}$ between the lenses.)

The lens $L_2$ refocuses the beam at focus $f_{p3}$ at a position $d_2 = d_1$ off the optical axis of the welding head 40. The center $C_L$ of the laser beam B is now misaligned relative to the optical axis A of the welding head 40 by the angle $$q_2 = (R_2 + d_2)/2f_{L2}. \tag{4}$$

The laser beam propagates through the remaining lenses $L_3$-$L_4$ in a similar fashion, obeying the relations given above and shown in FIG. 5. It should be noted that the relationship $$(R_n + D_n/2) < D'/2, \tag{5}$$

where n represents the number of an arbitrary nth lens and D' is the diameter of that lens, must be satisfied to keep the laser beam B within the limits of the lenses. If all of the lenses used in the system have the same diameter, this condition requires that focal lengths of the intermediate lenses must decrease with increasing values of n. In the embodiment illustrated in FIG. 5 each intermediate lens $L_2$-$L_4$ has a focal length greater than the next lens in the direction of propagation of the Beam. Where the housing 42 is flexible, as shown, the length of each corresponding segment $S_1$-$S_4$ is adjusted so that each focal point $f_{p1}$-$f_{p3}$ is near a respective center of rotation $C_{12}$-$C_{34}$.

$$f_{L2} > f_{L3} > f_{L4} > f_{Ln-1} \tag{6}$$

Figure 1:
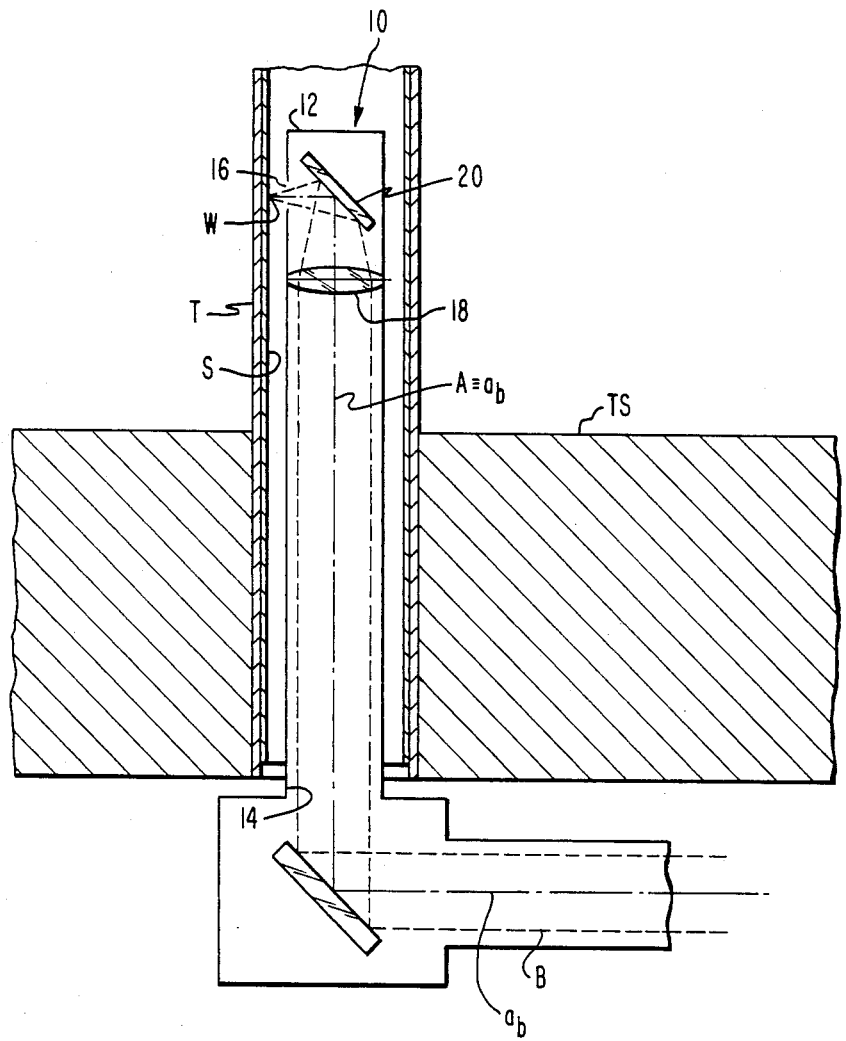
FIGS. 1-3 illustrate schematically and in simplified form a rigid welding head arrangement of the type disclosed in co-pending related U.S. patent application Ser. Nos. 821,673, 821,674 and 821,675, filed on Jan. 23, 1986, assigned to the assignee of the present invention, the teachings of which are incorporated herein by reference.
Figure 2:
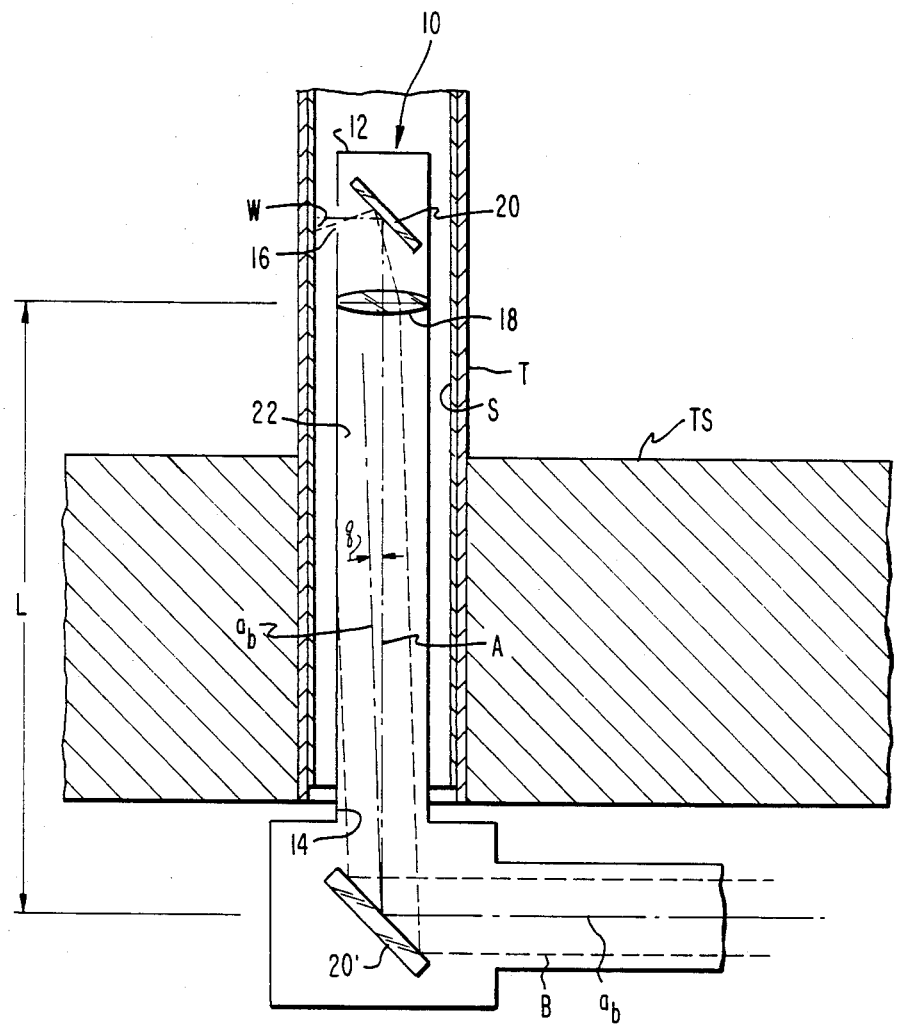
Figure 3:
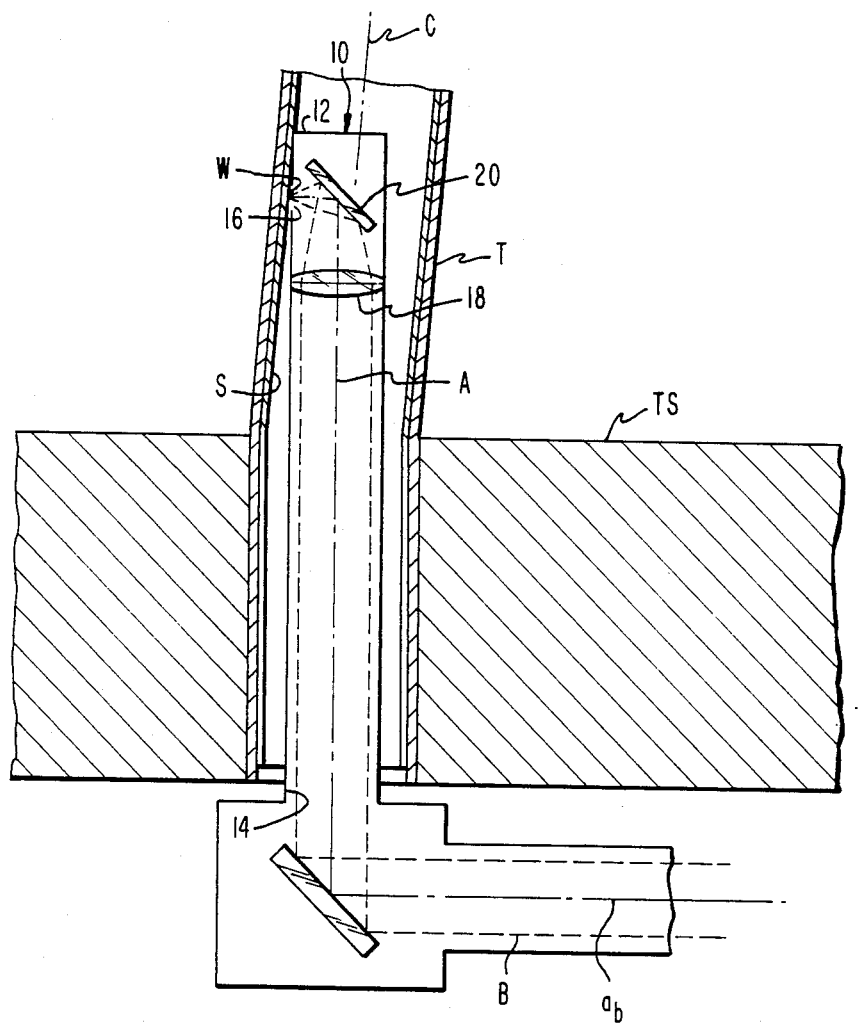

It is clear that only a small deviation of the beam axis $a_b$ from the optical axis A can be tolerated in the arrangement of FIG. 2. Whereas, in FIG. 5, although the angle q tends to increase as the laser beam B propagates through the welding head, greater misalignment errors can be tolerated before the beam will strike the side wall. For example, in FIG. 2 the maximum error that is acceptable is $$q' < (D' - D_1)/L, \tag{7}$$

where L is the total length of the welding head 10 from the incoming deflecting mirror 20' to lens 18, D' is the beam diameter at the lens 18, $D_1$ is the incoming beam diameter, and q' is the maximum angular misalignment q. The corresponding relation for the laser welding head 40 of the present invention may be derived from FIG. 5 wherein $$q_1' < (D' - D_1)/(f_{L1} + 2f_{L2}). \tag{8}$$

Thus, the maximum error is a function of the focal lengths of the first two lenses $L_1$ and $L_2$ near the inlet 44.

The relationship of equation (8) holds because each time the beam B is refocused along the welding head 40, the focal point $f_{pn}$ is on the opposite side of the optical axis A. Thus, initial misalignment errors tend to cancel each other, and the only error which is significant is the angular error which occurs between the first lens $L_1$ and the second lens $L_2$ given by equation (8). In a typical application the maximum error in alignment $q_1'$ from equation (8) may be 3-5 times the maximum error q' from equation (7).

Figure 6:
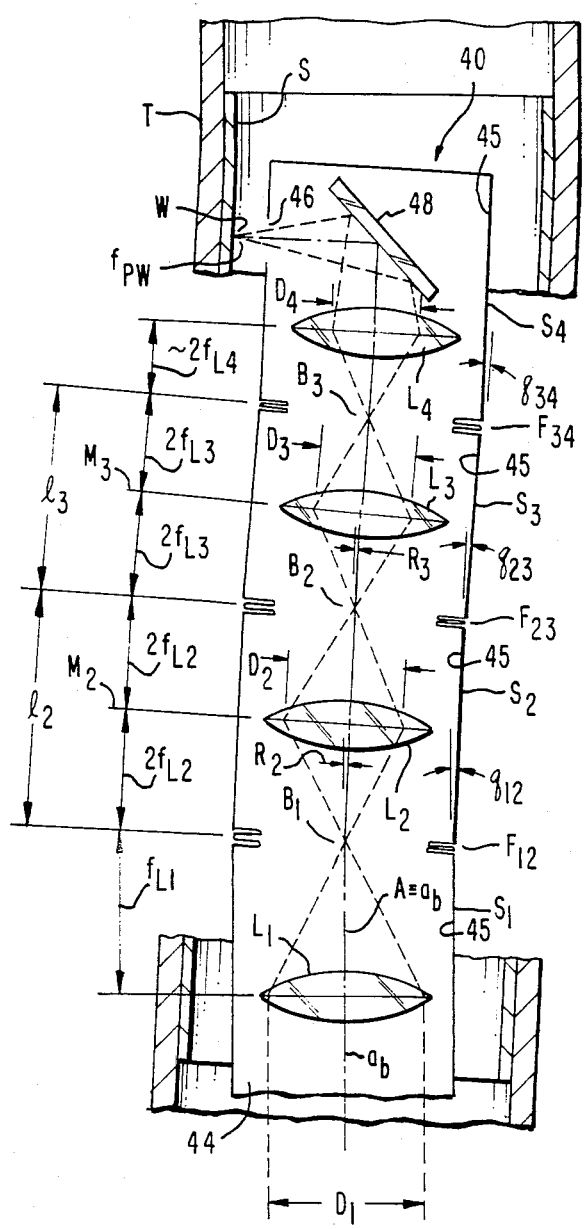
FIG. 6 is an illustration similar to FIG. 4 showing the segments of the welding head disposed with their respective axes out of alignment with the axes of adjacent segments so that the optical axis of the welding head is distorted and not disposed along a straight line, the distortion being as it might be when the welding head is located in a bent tube and further illustrating the path of the laser beam through the welding head.

Another important application of the laser welding head 40 of the present invention occurs in cases where the tube T to be repaired is bent or distorted. FIG. 6 shows an exaggerated configuration in which the welding head 40 is located in a bent or non-true tube T that is fitted with an inserted sleeve S. The flexible joints $F_{12}$-$F_{34}$ permit the segments $S_1$-$S_4$ to adjust to the contour of the tube T and sleeve S configuration about the respective centers of rotation $C_{12}$-$C_{34}$. Because the lenses $L_1$-$L_4$ are located in the corresponding individual segments $S_1$-$S_4$, the optical axis A of the welding head 40 follows the tube T in FIG. 6. The segments $S_1$ and $S_2$ are misaligned relative to each other by an angle $q_{12}$. The segments $S_2$ and $S_3$ are misaligned relative to each other by an angle $q_{23}$. Likewise the segments $S_3$ and $S_4$ are misaligned by an angle $q_{34}$.

In FIG. 6 the laser beam B is focused at $f_{p1}$, along the optical axis A of the weld head 40 and near the center of rotation $C_{12}$ of the joint $F_{12}$ as shown. The beam B propagates to the lens $L_2$ but is somewhat displaced by an amount $$R_2 = q_{12} \times 2f_{L2} \tag{9plk}$$

at the location of the lens $L_2$.

The corresponding conditions at the other lenses $L_3$ and $L_4$ are indicated at FIG. 6. As the welding head rotates about the optical axis A, the flexible joints $F_{12}$-$F_{34}$ readjust about the respective centers of rotation $C_{12}$-$C_{34}$ to conform to the tube T and sleeve S geometry, and the optical configuration is maintained as the circumferential weld is made.

In FIG. 6, the optical axis $a_b$ of the laser beam entering the weld head 40 at $L_1$ is shown aligned with the optical axis A of the weld head 40. It should be understood, however, that it is possible for the optical axis $a_b$ of the laser beam B to be misaligned relative to the optical axis A of the weld head 40, as shown and described in FIG. 5, and achieve satisfactory results in a bent tube T and sleeve S arrangement of FIG. 6. Thus, the laser welding head 40 of the present invention may accommodate both a misaligned laser beam B and a deformed tube T and sleeve S configuration at the same time. In the application contemplated in the present invention the angle between segments $q_{12}$, $q_{23}$, $q_{34}$ is typically up to about 3°. However, this should not be construed to limit the invention because greater angles are possible and may be achieved by those skilled in the art.

Figure 7:
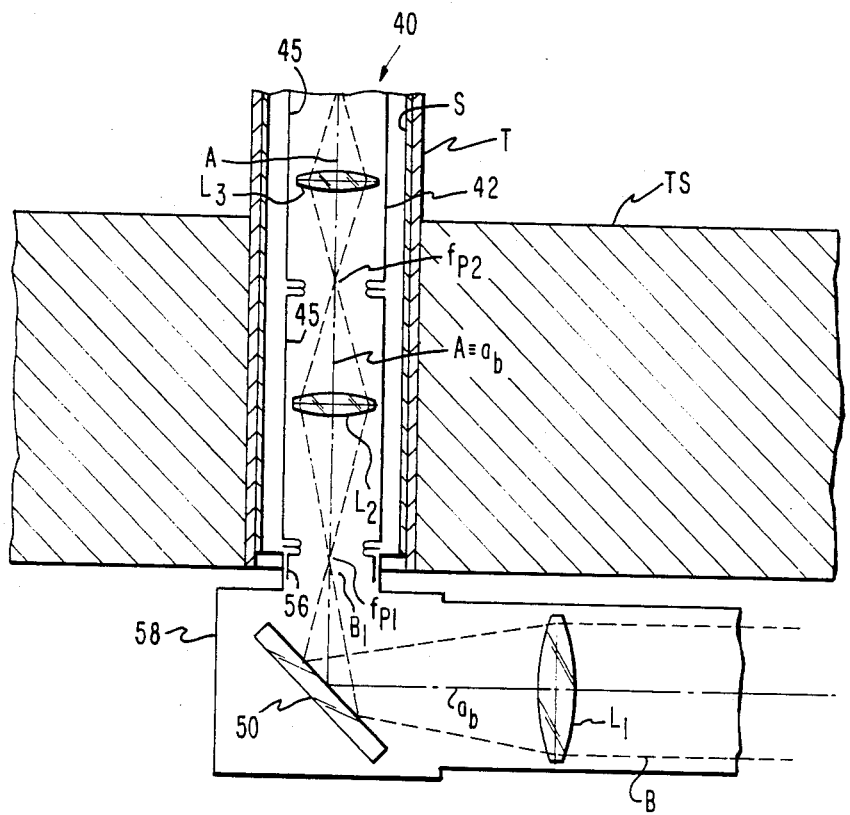
FIG. 7 is a schematic illustration in side section of a flexible welding head of the present invention having large converging lens and a deflecting mirror for reducing and directing the laser beam within the welding head.

In another embodiment of the present invention shown in FIG. 7, the lens $L_1$ acts as a beam reducing lens. The lens $L_1$ is located upstream of the inlet 44 of the welding head 40. The beam B, which is reduced by the first lens $L_1$, is directed at a deflecting mirror 50 and refocused at the first focal point $f_{p1}$ near the inlet 44 of the weld head 40. The beam B thereafter propagates through the lenses $L_2$-$L_3$ etc. as illustrated in FIG. 7.

Figure 8:
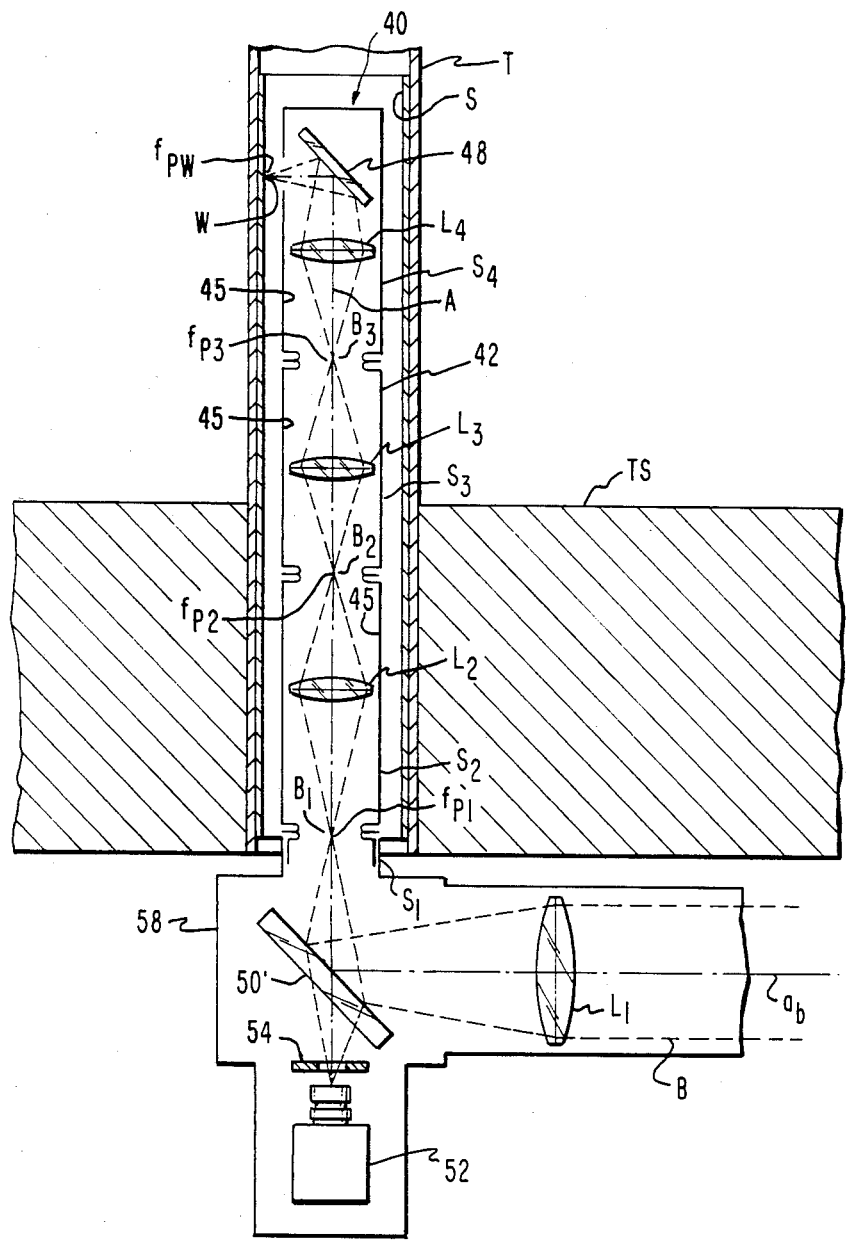
FIG. 8 is a schematic illustration similar to FIG. 7 with a built in beam splitter and television camera enabling in situ inspection of the welding operation and the resulting weld.

In another embodiment of the present invention illustrated in FIG. 8, a television camera 52 is provided which is adapted to view the welding operation and inspect the weld. In FIG. 8 a beam splitter 50' is substituted for the mirror 50 in FIG. 7 and a TV camera 52 and shutter 54 are located in alignment with the optical axis A of the welding head 40 as shown. The beam splitter 50' has a high reflectivity for laser radiation (incident from the right) and has a high transmission for visible wavelengths. Beam splitters having such characteristics are available in the art and are hence not described in detail herein.

In the system described in FIG. 8, the laser beam B is deflected into the welding head 40 as before and the TV camera 52 can view the welding region W. In operation, the lens $L_4$ forms an image of the welding region W at the focal point $f_{p3}$. The lens $L_3$ captures the image which is propagated along the optical axis A towards the beam splitter and the TV camera 52. A shutter 54 is located in front of the TV camera 52 and protects the camera 52 from the intense radiation produced by the laser beam B. The shutter 54 may be a mechanical device or may be a neutral density filter which greatly attenuates the energy reflected from the welding area W. After the weld is completed the shutter 54 may be removed or opened to view the finished weld. An auxiliary source of light (not shown) may be provided to illuminate the weld area.

In each of the embodiments of the present invention and as illustrated in FIGS. 7 and 8, a rotatable connection or joint 56 is located near a proximal end of the weld head for interconnection with portions 58 of the apparatus shown external of the tube T. The joint 56, schematically shown, may have a configuration similar to the arrangement shown in the above referenced related patent applications.

For a variety of reasons, the optical axis $a_b$ of the laser beam B may drift. For example the beam B may drift because the welding head 40 or the lenses $L_1$-$L_4$ have become heated thereby changing the position of the beam B relative to the optical axis A of the weld head 40. Various techniques have been used to detect the position of the beam or a drift or deviation in the position of the beam along the optical axis A. These techniques generally rely on the absorption of the laser energy by a photo detector or a thermal detector.

Figure 9:
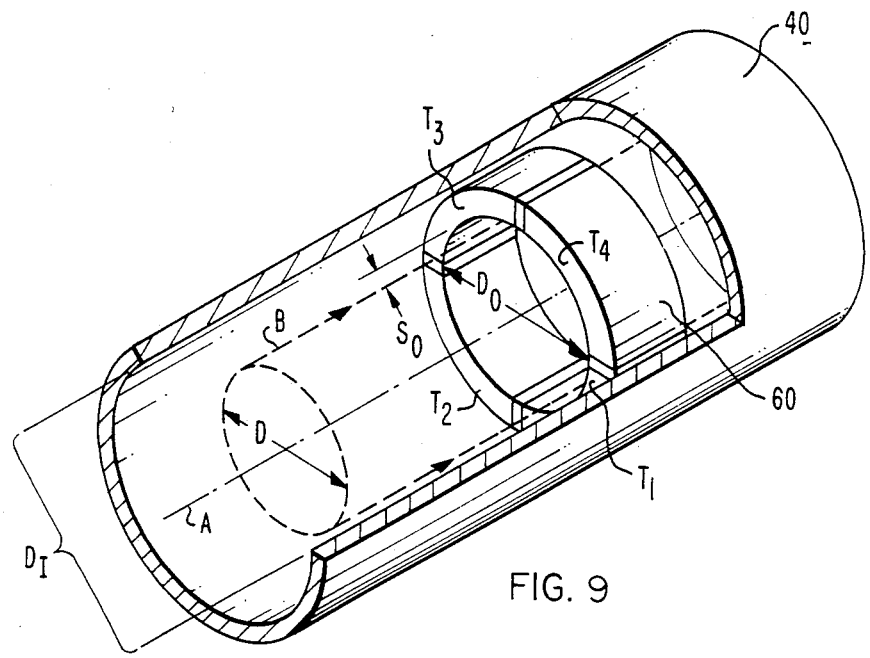
FIG. 9 is a perspective illustration of a partly broken away portion of a welding head having a beam drift detector installed therein, wherein the laser beam is cylindrical in configuration.

The detector 60 shown in FIG. 9 is in the form of an annular ring (sometimes referred to as a wander ring) divided into four quadrant segments or thermal detectors $T_1$-$T_4$ each of which produce an output in response to temperature. The detector 60 has a central aperture 62 of a diameter $D_0$. The laser beam B of diameter D (less than $D_0$) is directed at the aperture 62 of the detector 60 along the optical axis A. If the laser beam B is centered on the detector 60, it passes through the aperture 62 undisturbed. If the laser beam B drifts off, i.e., becomes misaligned with the optical axis A, part of the beam will strike the detector 60 causing one or more of the thermal detectors $T_1$-$T_4$ to become heated and warmer relative to the other segments. The outputs of the thermal detectors $T_1$-$T_4$, indicative of the temperature imbalance caused by differential heating, are coupled to means (not shown) which provides indication of the degree of beam drift.

In FIG. 9, welding head 40 is shown in sectional perspective. The internal diameter D of such a welding head 40 may be, for example, about ⅜". The beam B is a cylinder having an exemplary diameter D of about ¼". Because it is usually desirable to have as large a laser beam diameter D as possible, there is usually not much clearance between the beam B and the inside of the welding head 40. Thus, it is difficult to install a detector 60 inside the welding head 40 without either interfering with the propagation of a laser beam or reducing the beam diameter. For example, for a centered beam B, the available clearance $S_0$ between the beam and the detector 60 is an annular ring of thickness $D - D_o$ (typically a few thousands of an inch). Thus, there is not much available clearance between the laser beam B and the detector 60. Accordingly, in an arrangement using a cylindrical laser beam of a given diameter, the clearances may be such that it is very difficult to install a detector 60 in the weld head 40 for detecting beam drift.

Figure 10:
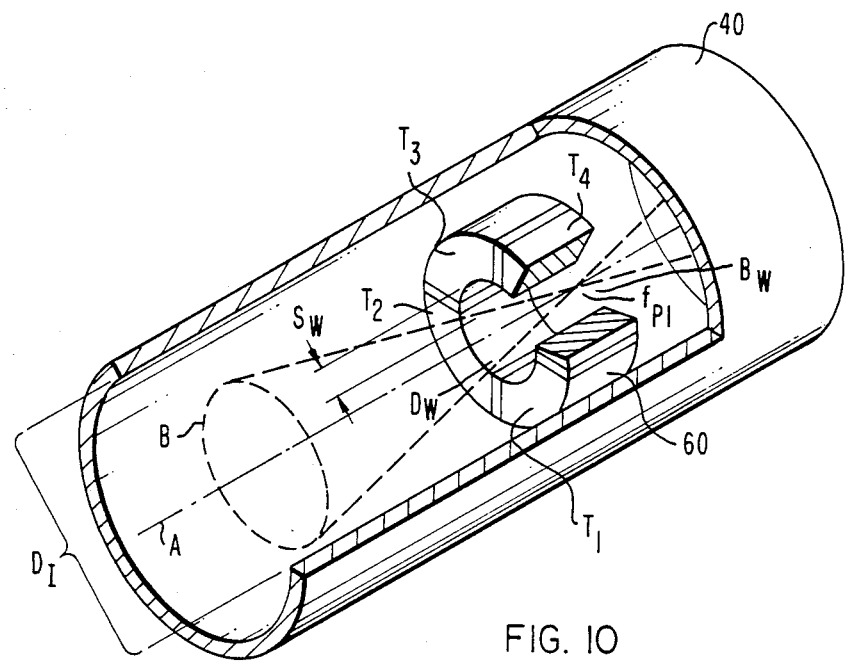
FIG. 10 is a perspective illustration of a partly broken away portion of a welding head having a beam drift detector installed therein, located in the vicinity of the beam waist of a laser beam having converging and diverging portions.

In the present invention, the refocusing technique described herein allows for more available clearance to install the detector 60 in a welding head of the same size as in FIG. 9 and the same beam diameter. In FIG. 10 the detector 60 is shown in the weld head 40 near a focus $f_p$ of the beam B. The beam converges towards a reduced diameter $D_w$ near the focus $f_p$. The convergence of the beam B is known as the beam waist $B_w$. For the same size detector 60 shown in FIG. 9, the clearance $S_w$ between the beam B and the detector 60 at the beam waist $B_w$ is $D_w - D_O$. In the embodiment shown in FIG. 10, the beam diameter $D_w$ near the beam waist $B_w$ is about 0.1". Thus, for the same size beam B, welding head 40 and detector 60 as shown in FIG. 9, the clearance $S_w$ can be increased significantly to a few hundredths of an inch or more. Thus, the beam diameter need not be reduced in order to install the detector 60. Although the laser beam B is not reduced to a point source at each focus $f_{p1}$-$f_{p4}$ (the laser beam at the beam waist Bw has a finite diameter $D_w$), the available clearance $S_w$ between the laser beam B and the detector 60 is significantly greater than in the arrangement of FIG. 9. Therefore, installation of a detector 60 in the narrow confines of the welding head 40 is facilitated as a result of the refocusing technique herein described.

Figure 11:
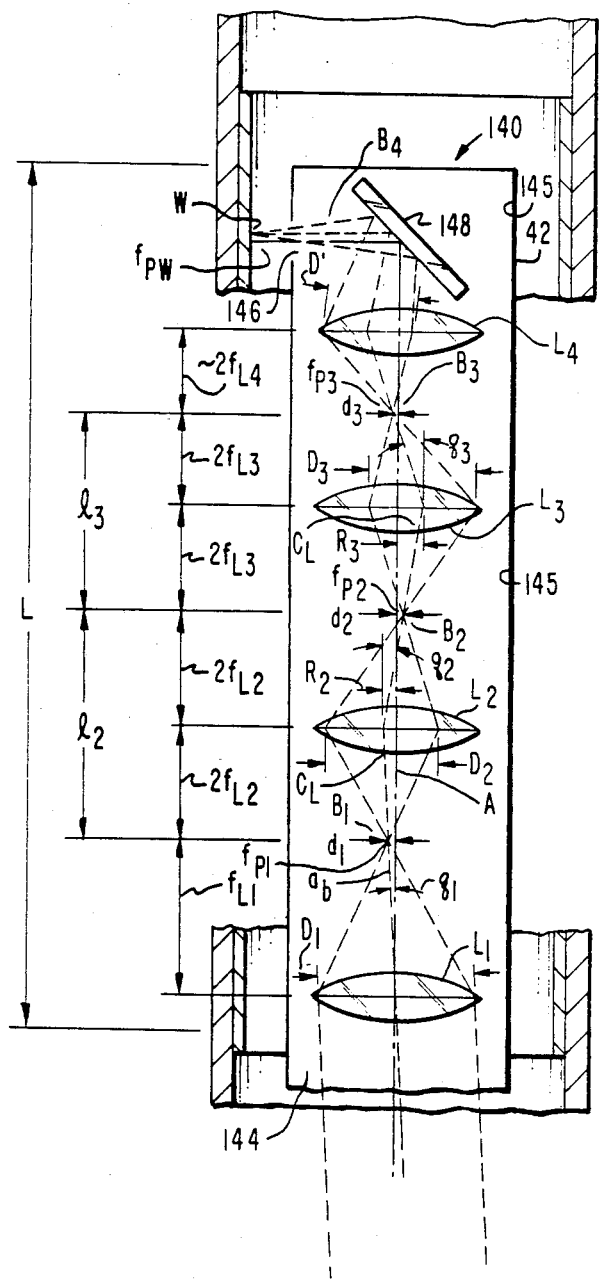
FIG. 11 is an illustration of a simplified embodiment of the invention having a rigid ousing.

FIG. 11 is an illustration of a simplified embodiment of the invention. In FIG. 11 a laser welding head 140, formed of a rigid cylindrical housing 142 having laser beam inlet 144 and laser beam outlet 146 and an optical axis A, is shown. A plurality of focusing means $L_1$-$L_4$ directs a laser beam B having an axis $a_b$ along the welding head 140 as shown.

In FIG. 11, for ease of description, the focusing means $L_1$-$L_4$ are located in positions geometrically similar to corresponding focusing means $L_1$-$L_4$ in FIG. 5. The only difference in the illustrations of FIGS. 5 and 11 is that in the latter, the housing 142 is rigid having no flexible joint means $F_{12}$-$F_{34}$ or individual segments $S_1$-$S_4$ as in FIG. 5.

FIG. 11 illustrates the corrective beam aligning feature of multiple focusing means $L_1$-$L_4$ whereby a misaligned laser beam B is refocused at focal points $f_{p1}$-$f_{p3}$ along the optical axis A of the housing 142. At each successive focal point $f_{p1}$-$f_{p3}$ refocusing occurs on opposite sides of the axis A from a previous focal point. The geometrical relationship of the focal points $f_{p1}$-$f_{p3}$ and the corresponding offset $d_{1-d3}$ of each respective focal point $f_{p1}$-$f_{p3}$ from the optical axis in FIG. 11 is the same as shown and described with respect to FIG. 5.

The arrangements described herein are examples of a symmetrical simple case where individual lens elements $L_1$-$L_4$ relay the beam B along the housing 42, 142 via focal points $f_{p1}$-$f_{p3}$ as shown. The shortest distance between successive focal points is four focal lengths of the particular lens between the two successive focal points. In the case of the flexible housing 42, the focal points are restricted to a zone near the respective centers of rotation $C_{12}$-$C_{34}$ of joints $F_{12}$-$F_{34}$. Thus, if the length of a particular segment $S_1$-$S_4$ is increased, the position of the corresponding lens $L_1$-$L_4$ may be changed to increase the distance between focal points to correspond to the distance between successive flexible joints $F_{12}$-$F_{34}$ and, where applicable, the length of the segments $S_1$-$S_4$ is changed accordingly.

In the present invention, the laser beam B is optically relayed along a series of interconnected straight line paths by several discrete lenses, which paths are coterminal with focal points of the respective corresponding lenses. Each focal point is coincident with the focal point of the next adjacent lens along the path, and realignment of the beam is accomplished by this relaying or refocusing technique.

In addition, in embodiments employing a flexible housing, the optics are designed to focus the beam B at locations near the centers of rotation of each interconnecting flexible joint to thereby relay the beam along a curved optical axis. Each focusing means may include one or more separate lenses as long as the focal distances satisfy the above conditions so that the beam is relayed from focal point to focal point through the bore of the housing.

The symmetry illustrated in the embodiments herein described, wherein each lens $L_1$-$L_n$ is an integral number of focal lengths (e.g., 2) from the opposite ends of adjacent segments, is exemplary only. Asymmetrical arrangements may be provided if desired and such arrangements are within the capacity of those skilled in the art.

In an optical system such as described above, a variety of lens materials may be used. For example, ZnSe lenses may be used. Such lenses are not well suited for the transmission of visible radiation as required for TV monitoring of the welding operation. Hence, lenses fabricated of KCl or NaCl which are ideally suited for this application may be used. Such lenses are effectively transparent both to a typical laser wavelength of 10.6 microns and to the visible wavelengths. Since these lens materials are subject to moisture damage, it is usually necessary to provide special coatings to protect them. Such coatings are available in the art.

There has thus been provided a laser welding head which is capable of sustaining significant misalignment between the laser beam and the optical axis of the welding head without significantly affecting the quality of the resulting weld or risking damage to the welding head. The flexible welding head is also capable of effecting welds in curved or distorted tubes and means is provided for detecting misalignment or drift of the laser beam within the weld head.

CONCLUSION

While the invention has been described in connection with specific embodiments thereof, it will be understood that it is capable of further modifications. This application is intended to cover any variations, uses or adaptions of the invention following, in general, the principles of the invention, and including such departures from the present disclosure as come within known and customary practice within the art to which the invention pertains.

We claim as our invention:

1. A laser welding head for welding a sleeve within a tube by fusing at the weld site the interface therebetween with a laser beam comprising:
 a rotatable cylindrical housing having a laser beam inlet for receiving the laser beam therein, a laser beam outlet for delivering the laser beam to the weld site and an optical axis therebetween, said housing formed of a hollow cylindrical member, said housing adapted to be inserted axially into the tube and sleeve with the laser beam outlet directed at the weld site of said interface, said hollow cylindrical member being formed of a plurality of axially interconnected hollow cylindrical segments and flexible joint means axially interconnecting the segment about a center of rotation between segments; and
 a plurality of focusing means for said housing, said plurality of focusing means being mounted in the housing along the optical axis thereof for receiving and refocusing the laser beam from the laser beam inlet to the laser beam outlet along a central axis of the laser beam aligned relatively closely with the optical axis of the housing, at least one each of said focusing means being mounted in a corresponding segment, each of said focusing means mounted in its corresponding segment having an associated focal length and being positioned in its corresponding segment at least two focal lengths from the flexible joint means so that each such focusing means refocuses the laser beam at a point near the center of rotation of said flexible joint means.

2. The laser welding head of claim 1 wherein the joint means comprises a circular radially convoluted bellows for interconnecting each pair of adjacent segments, said bellows allowing one segment to pivot relative to its interconnected adjacent segment about a point corresponding to the intersection of the focal lengths of said focusing means.

3. The laser welding head of claim 1 wherein said housing comprises a first segment disposed at the laser beam inlet of the welding head remote from the weld site, said first segment having one of said focusing means mounted therein for refocusing the laser beam to a point between the first segment and the next adjacent segment of said housing in the direction of propagation of the laser beam, said point being at least one focal length from said focusing means.

4. The laser welding head of claim 1 wherein the segments include a first segment at the laser beam inlet having one of the focusing means located one focal length from the center of rotation in the direction of propagation of the laser beam; a last segment having the laser beam outlet therein located remote from the first segment and having one of the focusing means adjustably located therein at a position at about two focal lengths from the center of rotation of the segment opposite the direction of propagation of the laser beam; and at least one intermediate segment having one of the focusing means located midway between the ends of the segment.

5. The laser welding head of claim 1 wherein the tube and sleeve have corresponding axes different from the axis of the cylindrical housing and the welding head is sufficiently flexible to conform to the axes of the tube and sleeve located therein.

6. The laser welding head of claim 1 wherein the cylindrical housing is sufficiently flexible such that it may be rotated about the optical axis of the cylindrical housing 360 degrees.

7. The laser welding head of claim 6 wherein the path of the laser beam remains relatively close to the axis of the cylindrical housing as the laser beam propagates along the welding head and as it is rotated.

8. The laser welding head of claim 1 wherein the focusing means for each segment is an integral number of focal lengths from the center of rotation of each immediately adjacent joint means.

9. The welding head of claim 1 wherein the laser beam outlet is in a side wall of the cylindrical housing in a segment remote from the laser beam inlet, and a mirror is located in the path of the laser beam between the focusing means for the remote segment and the laser beam outlet for directing the laser beam radially of the housing towards the weld site.

10. The laser welding head of claim 1 wherein at least one of said focusing means is located near the laser beam inlet for realigning initial misalignment of the laser beam.

11. The laser welding head of claim 1 further including detector means within the housing near a focal point for detecting drift of the laser beam within the housing.

12. A laser welding head comprising:
 a plurality of cylindrical segments each having a hollow bore and each having open circular ends, said segments being disposed end to end generally along a common axis with their bores aligned, said welding head having a laser beam inlet and a laser beam outlet, a plurality of flexible means interconnecting adjacent segments, a first of said segments providing said laser beam inlet at one end of said interconnected segments, a last of said segments remote from said first segment providing said laser beam outlet, each of said segments having focusing means respectively disposed within its bore, said focusing means being disposed for directing a laser beam from said laser beam inlet to said laser beam outlet, said focusing means including discrete lens elements for receiving and refocusing the laser beam at focal points along a plurality of straight lines from one focusing means to the next, the focal points between adjacent lens elements coinciding with the flexible means, said focusing means being capable of maintaining the laser beam along a path relatively close to a central axis of each said segment so that the laser beam propagates through said segments with substantially no loss associated with scattering of the laser beam within the welding head, the laser beam outlet being located in a side wall of the cylindrical housing in a segment remote from the laser beam inlet, and a mirror mounted in said remote segment and being located in the path of the laser beam between the focusing means for the remote segment and the laser beam outlet for directing the laser beam radially of the housing towards the outlet, each segment including at least one of said focusing means located at a position at least two focal lengths from the next adjacent interconnecting means.

13. The welding head of claim 12 wherein each segment includes one of said focusing means located at a position an integral number of focal lengths from the next adjacent interconnecting means.

14. The welding head of claim 12 wherein the first one of said focusing means is located in a first of the segments at a position at least one focal length from the next segment, and the focusing means for the next segment is located midway between the immediately adjacent segments at least two focal lengths from adjacent flexible means, and the last segment has a focusing means adjustably located about two focal lengths from the adjacent flexible means.

15. The welding head of claim 12 further including means aligned with the optical axis of the housing for viewing the weld site.

16. The welding head of claim 12 further including detector means comprising an annular ring located in the housing near a focal point, said ring being divided into thermally responsive symmetrical segments for detecting impingement of laser beam energy thereon to provide indication of laser beam drift.

17. The welding head of claim 12 wherein the segments have intersecting optical axis interconnected end to end, and each focusing means for each corresponding segment has a focal point on its optical axis for receiving, refocusing and relaying the laser beam within the segments from the laser beam inlet to each successive focusing means to the laser beam outlet, said focusing means causing the laser beam to refocus near the focal point of each successive focusing means on an opposite side of the optical axis of the segment when the laser beam is relatively misaligned with the optical axis of the segment to thereby compensate for said misalignment.

* * * * *